(12) United States Patent
Moolla (10) Patent No.: US 11,341,586 B1
(45) Date of Patent: *May 24, 2022

(54) SOCIAL MEDIA ASSESSMENT TOOL

(71) Applicant: Wells Fargo Bank, N.A., San Francisco, CA (US)

(72) Inventor: Roohi Moolla, Tiburon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/665,693

(22) Filed: Oct. 28, 2019

Related U.S. Application Data (63) Continuation of application No. 14/732,187, filed on Jun. 5, 2015, now Pat. No. 10,460,399.

(51) Int. Cl.
*G06Q 50/00* (2012.01)
*G06Q 10/06* (2012.01)

(52) U.S. Cl.
CPC ....... *G06Q 50/01* (2013.01); *G06Q 10/06393* (2013.01)

(58) Field of Classification Search
CPC .............. G06Q 10/06393; G06Q 50/01; G06Q 10/063; G06F 17/30864
USPC ............ 705/7.11, 7.29, 7.38, 7.39, 319, 1.1; 709/204, 224, 245; 707/748
See application file for complete search history.

(56) References Cited

U.S. PATENT DOCUMENTS

| | | | |
|---|---|---|---|
| 7,720,835 B2 | 5/2010 | Ward et al. | |
| 8,291,016 B1 | 10/2012 | Whitney et al. | |
| 8,504,681 B1 | 8/2013 | Cooper et al. | |
| 8,539,329 B2 | 9/2013 | Wilson | |
| 8,683,031 B2 | 3/2014 | Green et al. | |
| 8,812,958 B2 | 8/2014 | Willis et al. | |
| 2008/0167949 A1 | 7/2008 | Juliano et al. | |
| 2010/0030722 A1* | 2/2010 | Goodson | G06Q 30/02 706/54 |
| 2011/0004504 A1 | 1/2011 | Ives et al. | |
| 2011/0282943 A1 | 11/2011 | Anderson et al. | |
| 2012/0089429 A1 | 4/2012 | Geddes et al. | |
| 2013/0031171 A1 | 1/2013 | Serena | |
| 2014/0095598 A1 | 4/2014 | Schornack et al. | |
| 2014/0208222 A1 | 7/2014 | Simons et al. | |
| 2014/0289261 A1 | 9/2014 | Shivakumar | |
| 2016/0323173 A1* | 11/2016 | Bivens | H04L 43/14 |

FOREIGN PATENT DOCUMENTS

| | | |
|---|---|---|
| EP | 2216743 | 8/2010 |
| WO | 2014195958 | 12/2014 |

* cited by examiner

*Primary Examiner* — Igor N Borissov (74) *Attorney, Agent, or Firm* — Womble Bond Dickinson (US) LLP (57) ABSTRACT

Systems, methods, and other embodiments associated with a social media assessment tool. According to one embodiment, a social media assessment tool includes an identification logic that identifies interactivity criteria of a social media property. The interactivity criteria are associated with access to the social media property. The social media assessment tool also includes an assessment logic that determines that interactivity criteria satisfy a threshold value. In response to the social media property satisfying the threshold, the assessment logic calculates a score for at least one feature of the social media property.

20 Claims, 6 Drawing Sheets

SOCIAL MEDIA ASSESSMENT TOOL

CROSS-REFERENCE TO RELATED APPLICATION

This application is a continuation of and claims priority to U.S. patent application Ser. No. 14/732,187, filed Jun. 5, 2015 (issued Oct. 29, 2019 as U.S. Pat. No. 10,460,399), and entitled "SOCIAL MEDIA ASSESSMENT TOOL," the entirety of which is incorporated herein by reference.

BACKGROUND

Social media is the collective of online communication channels dedicated to community-based input, interaction, content sharing, and collaboration. Social media properties include websites and applications dedicated to forums, microblogging, social networking, social bookmarking, social curation, and wikis among others. The number and types of social media are so vast and varied that it can difficult for individual consumers to stay current. Even if a consumer is able to stay current, social media properties or services may blink out of existence as quickly as they came into being for any number of reasons including technological problems, funding problems, lack of interest, etc.

It is even more difficult for entities (e.g., businesses, financial institutions, universities) to determine if a social media property can be an asset to business. Accordingly, the decision to create and/or maintain a presence on a specific social media property can be convoluted for an entity.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

As discussed above, entities may find it difficult to determine whether to invest time and resources into creating and/or maintaining a social media presence on a social media property or service. Accordingly, an entity may assess the potential use of the social media property before investing significant time and resources into developing a social media presence on a specific social media property. For example, an entity may assess the compliance of a social media property with internal policies, such as an entity's own communication policies, and external policies, such as federally mandated regulatory schemes. Furthermore, the entity may continue to assess the efficacy of a specific social media property on an ongoing basis.

Engaging in social media may require the use of new or existing third-party service providers, social technologies, profiles, presences, and/or other tools, or new capabilities. Additionally, to comply with internal and external policies and requirements established by various regulatory bodies and internal policies, entities may wish to assess associated legal risk and compliance. Entities may further determine the impact and alignment of participation and/or use from the initial research to the adoption through retirement of the technology. These determinations may be assessed in accordance with business metrics, such as gains in terms of investment.

Entities, such as financial institutions, may use social media in a variety of ways, including marketing, providing incentives, facilitating applications for new accounts, inviting feedback from the public, and engaging with existing and potential customers. For example, an entity may receive and respond to complaints, or providing loan pricing using a social media property. Since this form of customer interaction tends to be both informal and dynamic, the entity may continually assess whether a social media property or service could be an asset or a liability.

The systems, methods, and other embodiments described herein assesses social media properties or services for use by entities, such as non-profit organizations, corporations, and financial institutions. In one embodiment, a social media assessment tool includes an identification logic that identifies interactivity criteria of a social media property. The interactivity criteria is associated with access to the social media property. The social media assessment tool also includes an assessment logic that determines that interactivity criteria satisfies a threshold value. In response to the social media property satisfying the threshold, the assessment logic calculates a score for at least one feature of the social media property. Furthermore, the scoring provides a granular assessment. The capability to assess a social media property allows an entity to determine whether creating and/or maintaining a presence on a social media property provides a benefit to the entity.

The following description and drawings set forth certain illustrative aspects and implementations. These are indicative of but a few of the various ways in which one or more aspects may be employed. Other aspects, advantages, or novel features of the disclosure will become apparent from the following detailed description when considered in conjunction with the drawings.

Figure 1:
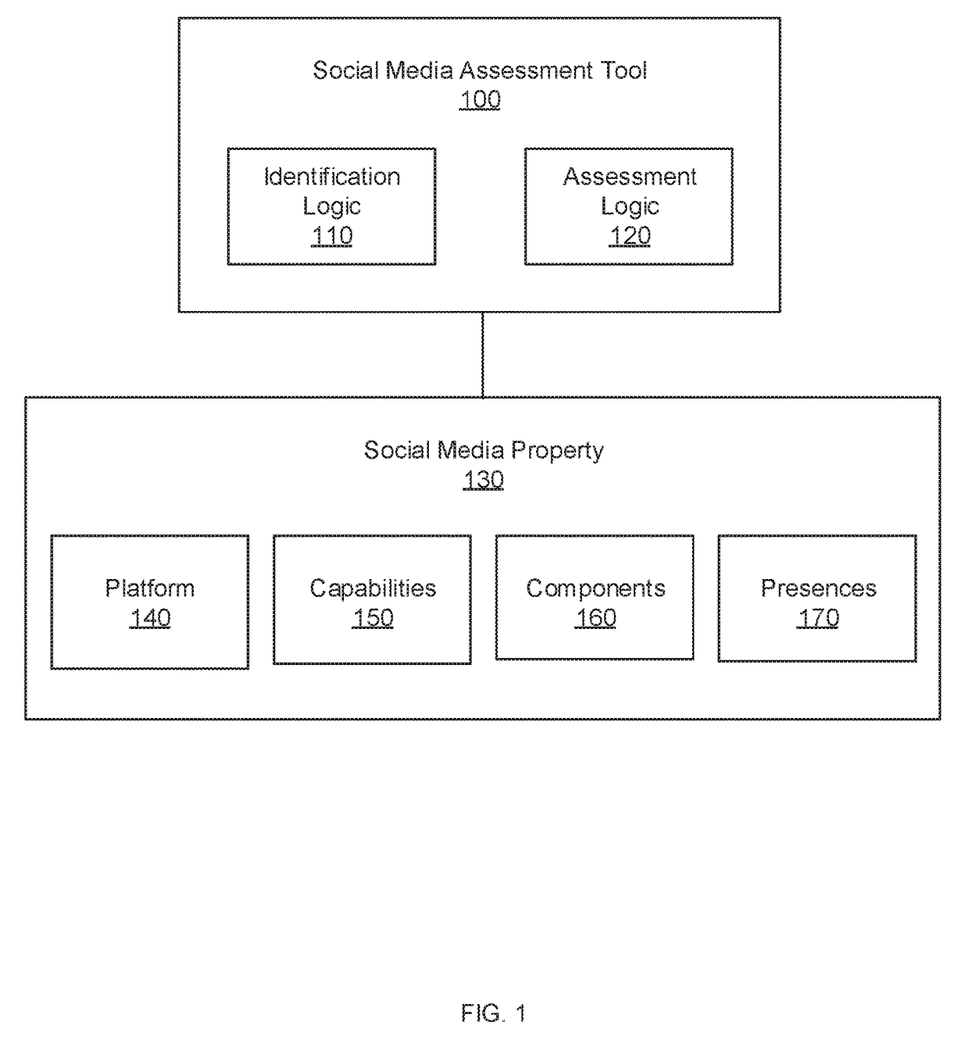
FIG. 1 illustrates one embodiment of a system associated with a social media assessment tool.

FIG. 1 is an illustration of an example a system associated with a social media assessment tool 100. The social media assessment tool 100 includes an identification logic 110 and an assessment logic 120. The social media assessment tool 100 operates to assess a social media property 130 including features organized in categories. The categories include platforms 140, capabilities 150, components 160, and presences 170. The assessment logic 120 compares the criteria to a threshold. If the criteria satisfies a minimum threshold, the assessment logic 120 scores a feature from at least one category such as the categories: the platform 140, the capabilities 150, components 160, and presences 170 of the social media property 130.

More specifically, the identification logic 110 identifies a social media property 130 having interactivity criteria and features. Firstly, the identification logic 110 identifies interactivity criteria of the social media property 130. The interactivity criteria are data regarding the availability of the social media property 130. For example, the interactivity criteria may include information about the number of users of the social media property 130, the length of time the social media property 130 has been in use, and whether the terms and conditions for using the social media property 130 are publically accessible and readily available. The interactivity criteria may also include information regarding the probable longevity of the social media property 130. In one embodiment, the interactivity criteria may include data about the financial viability of the social media property 130. For example, the interactivity criteria may be related to whether the social media property 130 is bootstrapped, fully funded, publically or privately held, a registered business entity, and so on. Accordingly, the interactivity criteria is associated with accessibility to the social media property 130.

The assessment logic 120 uses the interactivity criteria to make an initial assessment of whether the social media property can be useful. Thus, the assessment logic 120 evaluates the interactivity criteria to determine if the social media property 130 meets a threshold requirement of potential. In one embodiment, the assessment logic 120 compares the interactivity criteria to at least one threshold value. For example, the assessment logic 120 may set a minimum of 1,000,000 users before investing in the social media property. Likewise, the assessment logic 120 may set the minimum length of time the social media property 130 has been in use. In one embodiment, the threshold values may be dynamic based on a goal for the social media property. For example, a marketing rollout may be best suited to a social media property 130 with many users. Alternatively, a targeted marketing strategy may be better able to utilize a social media property 130 with a smaller number of users in a specific demographic.

In one embodiment, the social media property 130 may only have to satisfy a threshold of a single interactivity criterion. For example, the social media property 130 may only need to have the minimum number of users. Alternatively, a specific predetermined criteria or one of a plurality of criteria may be required to satisfy the threshold. In another embodiment, the threshold may be satisfied only if a combination of the interactivity criteria satisfies predetermined threshold values.

The assessment logic 120 determines whether the interactivity criteria satisfy at least one threshold. Accordingly, the interactivity criteria can be used, individually or collectively, to establish a baseline that indicates how widespread a social media property 130 is or is likely to become. This initial assessment of comparing interactivity criteria to a threshold indicates whether further assessment by the assessment logic 120 is warranted.

The identification logic 110 also identifies features of the social media property 130. In response to the threshold being satisfied, the assessment logic 120 assesses the features of the social media property 130. The social media property 130 is a hub for individuals to share ideas and or content. The social media property 130 may operate with a many-to-many model of information sharing, as opposed to traditional media, which relies on a one-to-many, one-way approach. Social media properties, like social media property 130, take on many different forms, including blogs and microblogs (e.g., Twitter®), content communities (e.g., YouTube®, Pinterest®), customer review sites (e.g., Yelp®), social networking sites (e.g., Facebook®), professional networking (e.g., LinkedIn®), collaborative projects (e.g., Wikipedia®), virtual game worlds (e.g., World of Warcraft®), and virtual social worlds (e.g., Second Life®). The features of the social media property 130 are categorized according to the categories: platforms 140, capabilities 150, components 160, and presences 170.

A feature is categorized as a platform 140 if the feature is an interactive online or mobile web site or application used for the purpose of engagement. The engagement may be between users with each other and/or other organizations/brands. The social media platform 140 feature may be a third party platform or internally hosted platform with a public implementation. For example, platform 140 features of the social media property 130 may include networks, communities, blogs, wikis, games, virtual worlds, mobile apps, reviews, and/or ratings. The social media property 130 may operate using multiple platform 140 features. For example, the social media property 130 may operate a game, a wiki for the game, and a mobile app for mobile access to the game.

A feature is categorized as a capability 150 of the social media property 130 if the feature is a potential use of the social media property 130. For example, the capabilities 150 may include new uses of existing properties, the components 160, or the presences 170 in concert with or without other technologies.

A feature is categorized as a component 160 of the social media property 130 if a feature is a tool of the social media property utilizes to function. For example, features categorized as components 160 may include application-programming interfaces (APIs), widgets, plugins, and feeds. For example, a feature may be a plugin may be used to add new interactive features to web sites, such as a box that integrates content from one website into another website. Accordingly, an independent application may be integrated with the platform 140 or one platform 140 with another platform 140.

A feature is categorized as a presence 170 of the social media property 130 if the feature is a way by which a user can communicate via the social media property 130. For example, features categorizes as presences 170 may include pages, profiles, handles, groups, boards, and so on.

In response to the criteria of the social media property 130 satisfying the threshold, the assessment logic 120 calculates a score for at least one feature from the platform 140, the capabilities 150, components 160, and presences 170 of the social media property 130. For example, suppose that an entity wants to create a profile on specific social media property 130, such as Facebook®. As discussed above, the entity performs an initial assessment based on criteria for the social media property 130. The assessment logic 120 determines that the criteria of the social media property 130 satisfies the minimum threshold and thus, is a viable option. Then the assessment logic 120 performs a full assessment based on a specified feature.

For example, suppose that an entity considers that the functionality of the API to be important so that the entity can create an application with specific attributes. The API is categorized as a component 160 of the social media property 130. Accordingly, a score is calculated for at least one feature, here the API, from the component category. The score is calculated in response to the social media property satisfying the threshold. The score may be calculated based on a number of characteristics of the feature and/or the category of the feature. In the example in which the feature is an API, the characteristics may include particular routines, protocols, and tools for building software applications. In one embodiment, the individual characteristics are weighted for the calculation. Furthermore, each category may have specific characteristics that are used to score the feature. For example, if a feature is categorized as a platform 140 based on the degree of an interactivity. Accordingly, the attributes of a specific category may determine how the feature is categorized.

A recommendation is generated for adoption or rejection of the social media property 130 based, at least in part, on the score. Thus, the entity may determine whether to adopt or reject a social media property 130 based on the criteria including the compliance of a social media property with internal policies, such as an entity's own communication policies, and external policies, such as federally mandated regulatory schemes. The entity can further assess the efficacy of a specific social media property 130 based on specific features that are desired by the entity.

Figure 2:
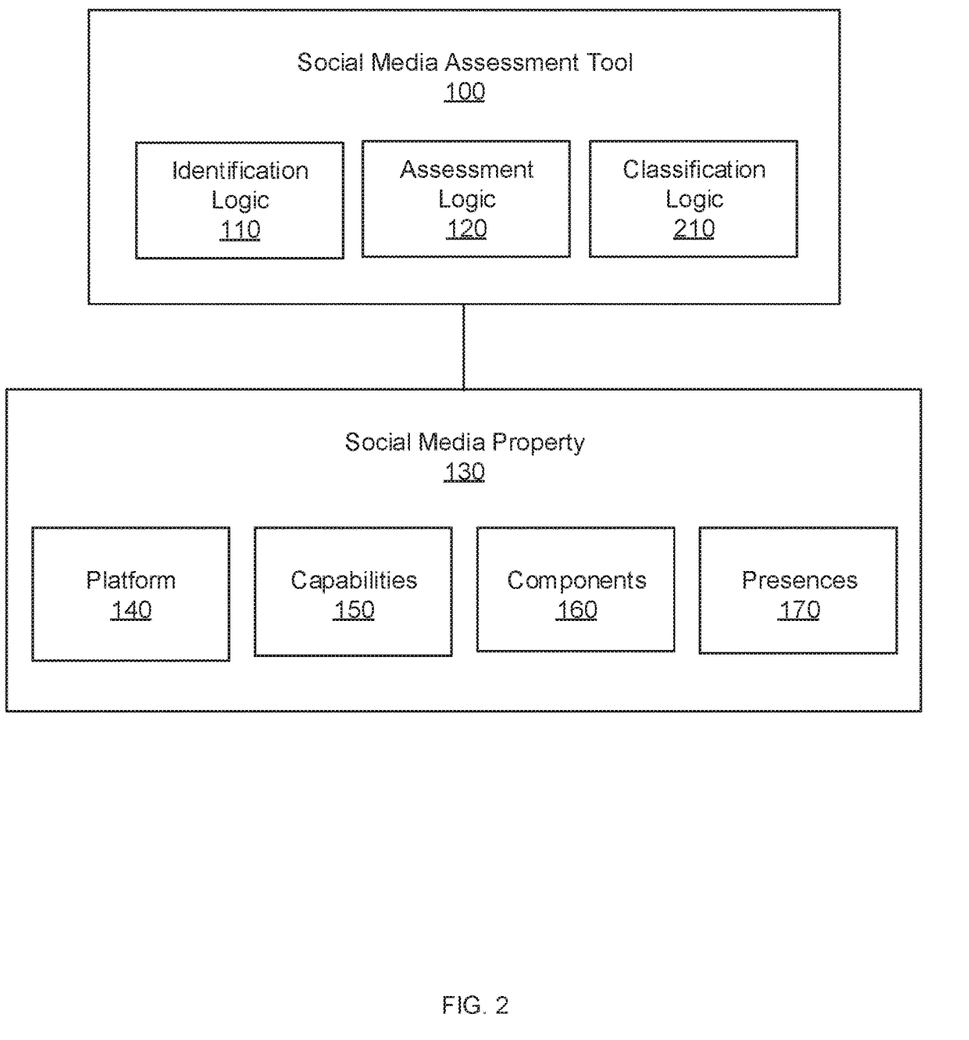
FIG. 2 illustrates one embodiment of a system associated with a social media assessment tool having a categorization logic.

FIG. 2 is an illustration of one embodiment of a social media assessment tool 200 having a categorization logic 210. The identification logic 110, the assessment logic 120, the social media property 130, and the categories of the social media property 130: the platforms 140, the capabilities 150, components 160, and presences 170, operate in a similar manner as described above with respect to FIG. 1.

In the embodiment shown in FIG. 2, a categorization logic 210 classifies the plurality of features into at least two categories. The classification logic 210 determines the classification of the features. To determine classification of a feature as a platform 140, capability 150, component 160, or presence 170 for the purpose of assessment, the categorization logic 210 considers a number of attributes. For example, the attributes may include the strategy, purpose, functionality, and use of the feature.

Classification of the feature may determine how a feature is scored by the assessment logic 120. As discussed above, each category may have specific characteristics that are used to score the feature. Likewise, the attributes used to categorize a feature may also factor into the scoring of the feature. Furthermore, the equation for scoring a feature may be varied based on the categorization. In one embodiment, the weighting of attributes may be based on the category of the feature.

Figure 3:
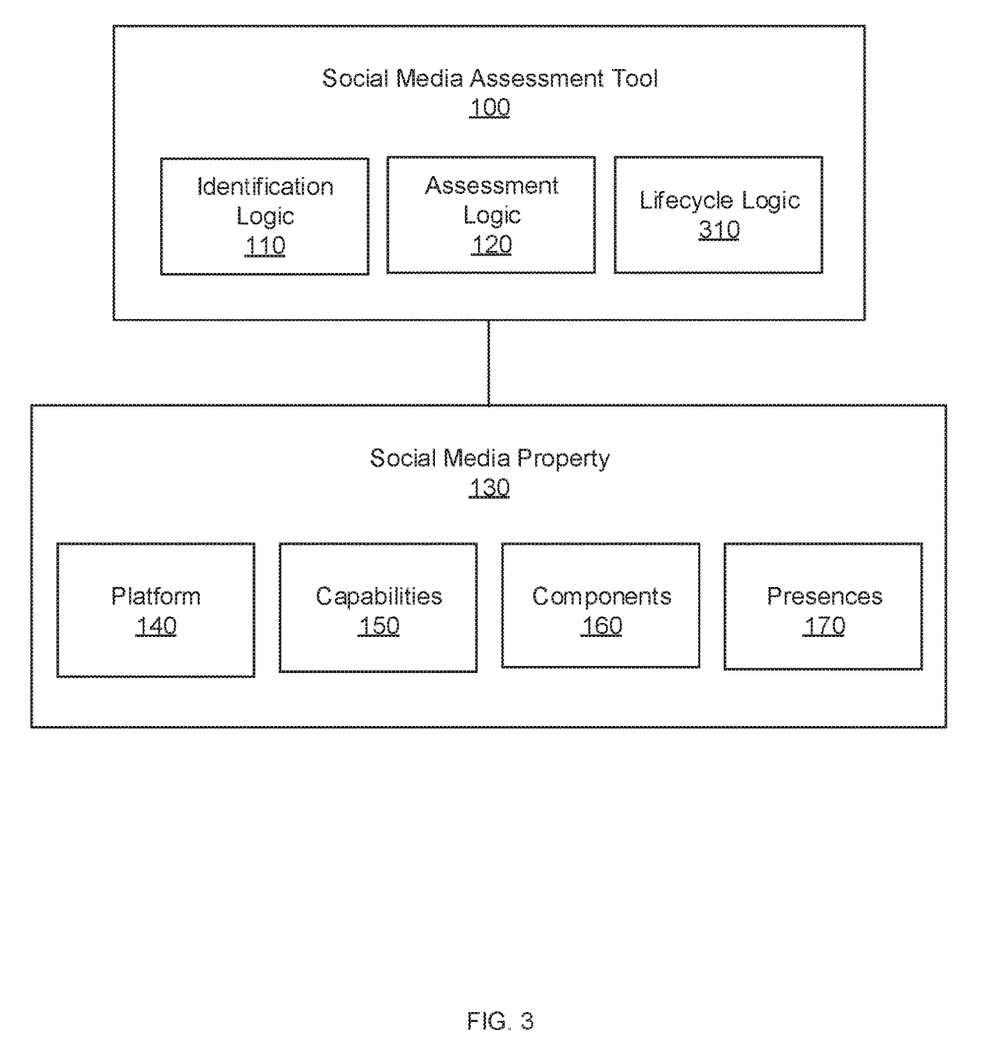
FIG. 3 illustrates one embodiment of a system associated with a social media assessment tool having a lifecycle logic.

FIG. 3 illustrates one embodiment of a system associated with a social media assessment tool 300 having a lifecycle logic 310. The lifecycle logic 310 manages the transition through phases of use (e.g., placeholder, adoption, retirement) of use of the social media property 130. In one embodiment, the social media property 130 is assessed before moving to the next phase. Accordingly, the lifecycle logic 310 monitors changes in the social media property 130 to determine if the social media property 130 has undergone changes that would affect its efficacy. For example, once a social media property 130 has launched, the lifecycle logic 310 is responsible for ongoing monitoring of changes to the social media property 130. The lifecycle logic 310 may monitor interactivity data for changes such as a drop in active users, technological problems, or loss of funding.

The lifecycle logic 310 may further notify the social media assessment tool 100 of changes to the social media property 130. The nature of the change, and the decision and associated timeline to change the level of engagement will be based on a number of factors similar to but not limited to the interactivity criteria. The lifecycle logic 310 may trigger a status change, such as triggering an exit strategy from the social media property 130. The factors affecting an exit strategy include determining if a phased exit is appropriate, how users and/or customers will be notified of the exit, assessing and planning for operational changes and any other potential factors that may impact the exit such as mitigation of technology integrations and/or dependencies, managing Social Care change impacts, and determining and managing changes in resource requirements.

Figure 4:
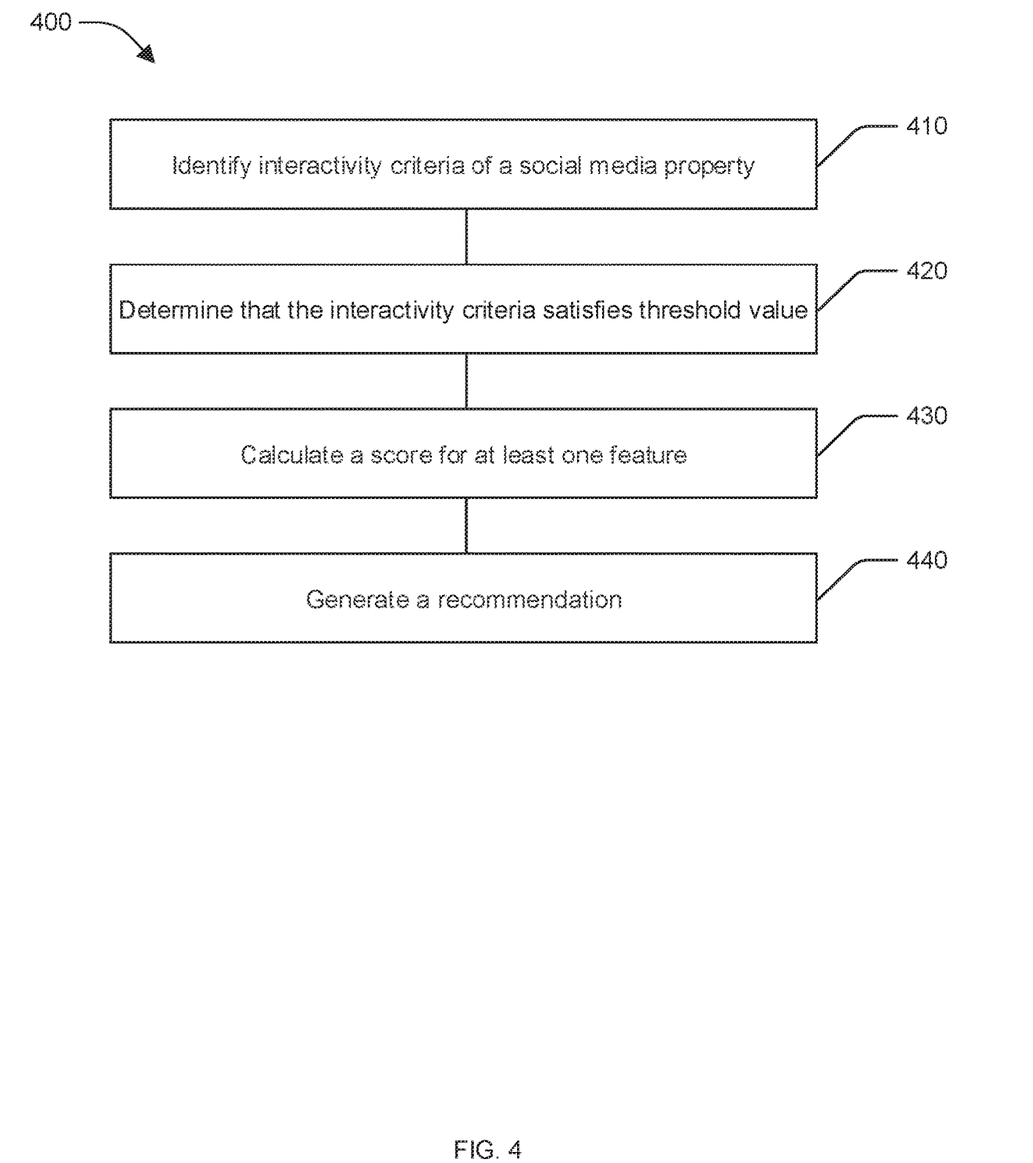
FIG. 4 illustrates one embodiment of a method associated with a social media assessment tool.

FIG. 4 illustrates one embodiment of a method associated with social media assessment tool previously described with respect to FIG. 1. At 410, interactivity criteria of a social media property is identified. The interactivity criteria is associated with access to the social media property. For example, as discussed above, interactivity criteria may include the primary purpose of the social media property, strategy, purpose, functionality, and use of the specific business case by a specific line of business. The interactivity criteria may also include the volume of current or proposed interaction.

At 420, it is determined that interactivity criteria satisfies a threshold value based, at least in part on the criteria. At 430, a score is calculated for at least one feature from a predetermined category. The score is calculated in response to the social media property satisfying the threshold. At 440, a recommendation is generated for adoption or rejection of the social media property based, at least in part, on the score.

Figure 5:
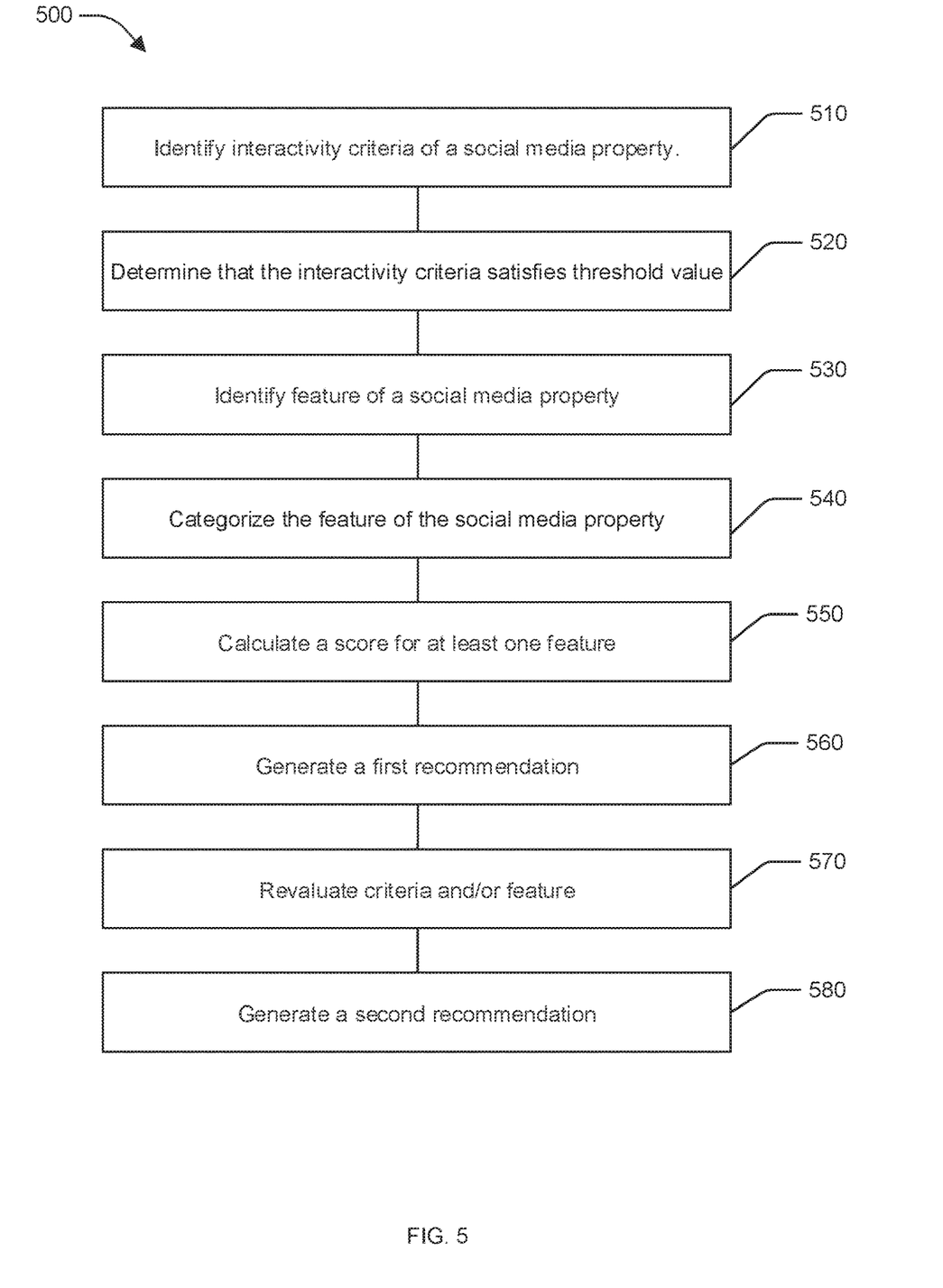
FIG. 5 illustrates one embodiment of a method associated with a social media assessment tool.

FIG. 5 illustrates one embodiment of a method associated with social media assessment tool previously described. Similar to 410 of FIG. 4, at 510, interactivity criteria of a social media property is identified. At 520, it is determined that interactivity criteria satisfies a threshold value based, at least in part on the criteria. At 530, a feature of the social media property is identified. At 540, the feature of the social media is categorized. As discussed above, the classification of a feature based at least in part on the strategy, purpose, functionality, and use of the feature.

At 550, a score is calculated for the feature. The scoring is based on the classification of the feature. For example, as discussed above, each category may have specific characteristics that are used to score the feature. Likewise, the attributes used to categorize a feature may also factor into the scoring of the feature.

At 560, a first recommendation is generated for adoption or rejection of the social media property based, at least in part, on the calculated score. The criteria and/or the feature of the social media property is periodically reconsidered to ensure that the social media property has not changed in a manner that makes continued use of the social media property untenable for the entity. Thus, at 570, the criteria and/or feature is reevaluated. For example, if the API is the identified feature, characteristics of the API are reevaluated to determine if the API is still feasible. At 580, a second recommendation is generated based at least in part on the reevaluation.

Figure 6:
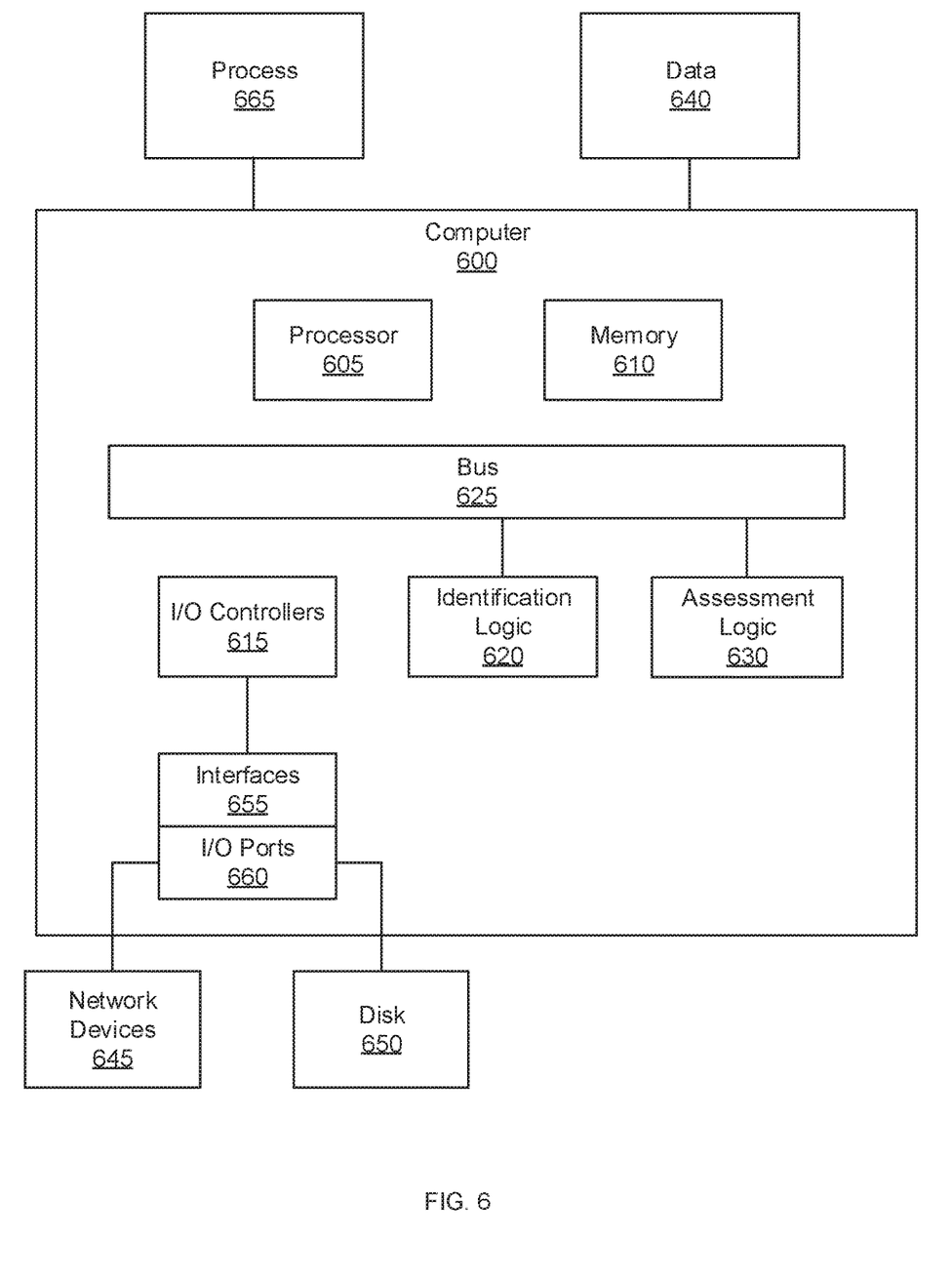
FIG. 6 illustrates one embodiment of an example computer environment associated with a social media assessment tool.

FIG. 6 illustrates one embodiment of an example computer environment associated with a social media assessment tool. The computer environment in which the systems and methods described herein, and equivalents, may operate may include a computer 600. The computer includes a processor 605, a memory 610, and input/output ports 660 operably connected by a bus 625. In one example, the computer 600 may include an identification logic 620 and an assessment logic 630. The identification logic 620 is configured to identify interactivity criteria and features of a social media property. The assessment logic 630 assesses the criteria and the feature. For example, the assessment logic 630 compares the identified criteria to a minimum threshold value to determine if the social media property meets minimum requirements of interactivity. In response to the criteria meeting the minimum threshold, the assessment logic 630 assess a predetermined feature of the social media property.

In different examples, the identification logic 620 and the assessment logic 630 may be implemented in hardware, a non-transitory computer-readable medium with stored instructions, firmware, and/or combinations thereof. While the identification logic 620 and the assessment logic 630 are illustrated as hardware components attached to the bus 625, it is to be appreciated that in one example, the identification logic 620 and/or the assessment logic 630 could be implemented in the processor 605.

In one embodiment, the identification logic 620 is a means (e.g., hardware, non-transitory computer-readable medium, firmware) for identifying criteria and features of the social media property. The assessment logic 630 is a means (e.g., hardware, non-transitory computer-readable medium, firmware) for assessing the criteria and features identified by the identification logic 620. The means may be implemented, for example, as an ASIC programmed identify and assess the criteria and features of the social media property. The means may also be implemented as stored computer executable instructions that are presented to computer 600 as data 640 that are temporarily stored in memory 610 and then executed by processor 605.

Generally describing an example configuration of the computer 600, the processor 605 may be a variety of various processors including dual microprocessor and other multi-processor architectures. A memory 610 may include volatile memory and/or non-volatile memory. Non-volatile memory may include, for example, ROM, PROM, and so on. Volatile memory may include, for example, RAM, SRAM, DRAM, and so on.

A disk 650 may be operably connected to the computer 600 via, for example, an input/output interface (e.g., card, device) 655 and an input/output port 660. The disk 650 may be, for example, a magnetic disk drive, a solid state disk drive, a floppy disk drive, a tape drive, a Zip drive, a flash memory card, a memory stick, and so on. Furthermore, the disk 650 may be a CD-ROM drive, a CD-R drive, a CD-RW drive, a DVD ROM, and so on. The memory 610 can store a process 665 and/or a data 640, for example. The disk 650 and/or the memory 610 can store an operating system that controls and allocates resources of the computer 600.

The bus 625 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 625 can be types including, for example, a memory bus, a memory controller, a peripheral bus, an external bus, a crossbar switch, and/or a local bus.

The computer 600 may interact with input/output devices via the i/o interfaces 606 and the input/output ports 660. Input/output devices may be, for example, a keyboard, a microphone, a pointing and selection device, cameras, video cards, displays, the network devices 645, the disk 650, and so on. The input/output ports 560 may include, for example, serial ports, parallel ports, and USB ports.

The computer 500 can operate in a network environment and thus may be connected to the network devices 545 via the I/O interfaces 555, and/or the I/O ports 560. Through the network devices 520, the computer 500 may interact with a network. Through the network, the computer 500 may be logically connected to remote computers. Networks with which the computer 500 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage medium may include, but are not limited to, a computer-readable medium, a floppy disk, a flexible disk, a hard disk, a magnetic tape, other magnetic medium, an ASIC, a CD, other optical medium, a RAM, a ROM, a memory chip or card, a memory stick, and other media that can store instructions and/or data. Computer storage medium described herein are limited to statutory subject matter under 35 U.S.C. § 101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logic as described herein is limited to statutory subject matter under 35 U.S.C. § 101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described herein is limited to statutory subject matter under 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. § 101.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system for controlling electronic structural connectedness to a networked computing system that comprises an element of an electronic social media property, the system comprising:
   a processor coupled to a memory that stores instructions, associated, that when executed by the processor cause the processor to change and be configured to:
      identify, by the processor prior to an initial usage of the electronic social media property, interactivity criteria and a plurality of features of the electronic social media property, wherein the interactivity criteria are associated with access to the electronic social media property, wherein the plurality of features is driven from a many to many model of information sharing and includes a plurality of predetermined categories, and the electronic social media property is a computer-network-accessible application;
      determine, by the processor prior to the initial usage, that the interactivity criteria satisfy a threshold;
      compute, by the processor prior to the initial usage, a score for the plurality of features; and
      generate, by the processor prior to the initial usage, a recommendation for initial adoption or rejection of the electronic social media property based on the computed score, wherein the system electronically structurally connects to the element of the electronic social media property of the networked computing system based on acceptance of the recommendation, else prevents electronically structurally connecting to the element of the electronic social media property of the networked computing system.

2. The system of claim 1, the instructions further cause the processor to classify the plurality of features each into the plurality of predetermined categories based on characteristics of the feature, wherein the score is calculated based on the plurality of predetermined categories.

3. The system of claim 2, wherein the plurality of categories comprise platforms, capabilities, components, and presences.

4. The system of claim 2, wherein classification is based on attributes of the at least one feature, and wherein the attributes include strategy, purpose, or use of at least one feature.

5. The system of claim 1, the instructions further cause the processor to:
   identify a plurality of features of the electronic social media property;
   classify each feature of the at least one feature into at least two categories; and
   compute a score for each feature based on the at least two categories after the social media service satisfies the threshold value.

6. The system of claim 1, the instructions further cause the processor to manage transition of the electronic social media property through phases of use, based on reevaluation of a number of factors, wherein the phases of use include placeholder, adoption, and retirement.

7. The system of claim 6, wherein the number of factors include the interactivity criteria.

8. A method that assesses an electronic social media property prior to an initial usage of the electronic social media property, the method comprising:
   executing on a processor instructions that cause a processor of a computer to change and perform operations comprising:
   identifying, prior to an initial usage of the electronic social media property, interactivity criteria and a plurality of features of the electronic social media property, each is an element of a networked computing system, wherein the interactivity criteria are associated with an access characteristic to the electronic social media property as an element of the networked computing system, wherein the plurality of features is driven from a many to many model of information sharing and includes a plurality of predetermined categories, and wherein the electronic social media property is a computer-network-accessible application;

determining, prior to the initial usage, that the interactivity criteria satisfy a threshold;

calculating, prior to the initial usage, a score for the plurality of features; and generating, prior to the initial usage, a recommendation for initial adoption or rejection of the social media service based on the calculated score, wherein the computer electronically structurally connects to the element of the electronic social media property of the networked computing system based on acceptance of the recommendation, else prevents electronically structurally connecting to the element of the electronic social media property of the networked computing system.

9. The method of claim 8, the operations further comprising classifying into the plurality of predetermined categories the plurality of features each based on characteristics of the each feature, wherein the score is calculated based on the category.

10. The method of claim 9, wherein the plurality of predetermined categories comprise platforms, capabilities, components, or presences.

11. The method of claim 8, the operations further comprising:

reevaluating the electronic social media property based on a number of factors; and managing transition of the electronic social media property through phases of use based on reevaluation, wherein the phases of use include placeholder, adoption, and retirement.

12. The method of claim 11, the operations further comprising reevaluating the social media service based on the number of factors including interactivity criteria.

13. The method of claim 11, the operations further comprising monitoring the interactivity criteria of the electronic social media property for reevaluating the electronic social media property.

14. The method of claim 11, the operations further comprising sending a notification that the electronic social media property has transitioned from a first phase of use to a second phase of use.

15. A non-transitory computer-readable medium storing computer-executable instructions that when executed by a plurality of hardware processors of a computer cause the computer to perform a method that assesses an electronic social media property prior to an initial usage of the electronic social media property, the method comprising:

identifying, prior to the initial usage of the electronic social media property, interactivity criteria and a plurality of features of the electronic social media property, each is an element of a networked computing system, wherein the interactivity criteria are associated with an access characteristic to the electronic social media property as an element of the networked computing system, wherein the plurality of features is driven from a many to many model of information sharing and includes a plurality of predetermined categories, and wherein the social media service is a computer-network-accessible application;

determining, prior to the initial usage of the electronic social media property, that the interactivity criteria satisfy a threshold;

calculating, prior to the initial usage of the electronic social media property, a score for the plurality of features; and generating, prior to the initial usage of the electronic social media property, a recommendation for initial adoption or rejection of the social media service based on the score wherein the computer electronically structurally connects to the element of the electronic social media property of the networked computing system based on acceptance of the recommendation, else prevents electronically structurally connecting to the element of the electronic social media property of the networked computing system.

16. The non-transitory computer-readable medium of claim 15, further comprising:

monitoring the interactivity criteria of the electronic social media property;

reevaluating the electronic social media property based on the interactivity criteria; and managing transition of the electronic social media property through phases of use based on the reevaluation, wherein the phases of use include placeholder, adoption, and retirement.

17. The non-transitory computer-readable medium of claim 16, wherein managing transition of the electronic social media property includes generating a secondary recommendation.

18. The non-transitory computer-readable medium of claim 16, further comprising sending a notification that the electronic social media property has transitioned from a first phase of use to a second phase of use.

19. The non-transitory computer-readable medium of claim 15, further comprising classifying the plurality of features each into the plurality of predetermined categories based on characteristics of the each feature, wherein the score is calculated based on the category.

20. The non-transitory computer-readable medium of claim 19, wherein the plurality of predetermined categories comprise platforms, capabilities, components, or presences.

* * * * *